US009449234B2

(12) United States Patent
Kelley et al.

(10) Patent No.: US 9,449,234 B2
(45) Date of Patent: Sep. 20, 2016

(54) DISPLAYING RELATIVE MOTION OF OBJECTS IN AN IMAGE

(71) Applicant: International Business Machines Corporation, Armonk, NY (US)

(72) Inventors: John F. Kelley, Clarkesville, GA (US); Kristin S. Moore, Atlanta, GA (US); Todd P. Seager, Orem, UT (US); Kenneth R. Stern, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 14/231,097

(22) Filed: Mar. 31, 2014

(65) Prior Publication Data

US 2015/0278600 A1    Oct. 1, 2015

(51) Int. Cl.
 *G06K 9/00* (2006.01)
 *G06T 7/20* (2006.01)
(52) U.S. Cl.
 CPC ....... *G06K 9/00791* (2013.01); *G06K 9/00805* (2013.01); *G06T 7/2033* (2013.01)
(58) Field of Classification Search
 None
 See application file for complete search history.

(56) References Cited

U.S. PATENT DOCUMENTS

| | | | |
|---|---|---|---|
| 4,522,475 A | 6/1985 | Ganson | |
| 5,307,170 A | 4/1994 | Itsumi et al. | |
| 5,369,461 A | 11/1994 | Hirasawa et al. | |
| 6,320,979 B1 | 11/2001 | Melen | |
| 6,603,485 B2 | 8/2003 | Forman | |
| 6,624,402 B2 | 9/2003 | Kaneko et al. | |
| 6,801,717 B1 | 10/2004 | Hofer | |
| 6,993,159 B1 * | 1/2006 | Ishii | B60R 1/00 345/419 |
| 7,006,709 B2 | 2/2006 | Kang et al. | |
| 7,249,170 B2 | 7/2007 | Tindal et al. | |
| 7,398,434 B2 | 7/2008 | Auvenshine et al. | |
| 7,551,770 B2 | 6/2009 | Harman | |
| 7,676,559 B2 | 3/2010 | Cuervo | |
| 7,689,685 B2 | 3/2010 | Ahmed et al. | |
| 7,706,632 B2 | 4/2010 | Gouch | |

(Continued)

FOREIGN PATENT DOCUMENTS

| | | |
|---|---|---|
| CN | 1926851 A | 3/2007 |
| CN | 102422630 A | 4/2012 |

(Continued)

OTHER PUBLICATIONS

Bargh, Peter, "Focus Stacking—a macro photography technique", YouTube Video, uploaded on Apr. 10, 2008, Printed on: Jun. 29, 2015, pp. 1-4, <https://www.youtube.com/watch?v=fJiEw4VCcYU>.

(Continued)

*Primary Examiner* — Atiba O Fitzpatrick
(74) *Attorney, Agent, or Firm* — Edward J. Wixted, III

(57) ABSTRACT

In a method for visualizing motion of an object in an image, at least two images, including a first image and a second image, wherein each of the at least two images includes an object are received. One or more processors determine a first distance value for the object in the first image and a second distance value for the object in the second image, wherein each distance value is based on a distance between the object and an image capturing device. One or more processors compare the first distance value to the second distance value to determine a difference between the first distance value and the second distance value. One or more processors generate an indication based on the determined difference between the first distance value and the second distance value.

20 Claims, 9 Drawing Sheets

(56) References Cited

U.S. PATENT DOCUMENTS

| | | | |
|---|---|---|---|
| 7,711,259 | B2 | 5/2010 | Daley |
| 7,747,067 | B2 | 6/2010 | Popescu et al. |
| 7,757,268 | B2 | 7/2010 | Gupta et al. |
| 7,962,445 | B2 | 6/2011 | Auvenshine et al. |
| 8,082,337 | B1 | 12/2011 | Davis et al. |
| 8,254,630 | B2 | 8/2012 | Abe |
| 8,406,548 | B2 | 3/2013 | Ali et al. |
| 8,432,434 | B2 | 4/2013 | Veeraraghavan et al. |
| 8,576,326 | B2 | 11/2013 | Kawamura |
| 8,638,329 | B2 | 1/2014 | Izumi |
| 8,724,009 | B2 | 5/2014 | Tay |
| 8,983,176 | B2 | 3/2015 | Kelley et al. |
| 9,076,204 | B2 | 7/2015 | Ogura et al. |
| 9,196,027 | B2 | 11/2015 | Brown et al. |
| 2002/0041339 | A1 | 4/2002 | Diepold |
| 2004/0036923 | A1 | 2/2004 | Kokemohr et al. |
| 2005/0050193 | A1 | 3/2005 | Edwiges et al. |
| 2005/0157204 | A1 | 7/2005 | Marks |
| 2006/0072851 | A1 | 4/2006 | Kang et al. |
| 2006/0072852 | A1 | 4/2006 | Kang et al. |
| 2007/0053675 | A1 | 3/2007 | Pollard |
| 2007/0269119 | A1 | 11/2007 | Hyerle et al. |
| 2008/0031327 | A1 | 2/2008 | Wang et al. |
| 2008/0175576 | A1 | 7/2008 | Hong et al. |
| 2008/0309770 | A1 | 12/2008 | Florea et al. |
| 2010/0157127 | A1 | 6/2010 | Takayanagi et al. |
| 2010/0182495 | A1 | 7/2010 | Murata |
| 2010/0303373 | A1 | 12/2010 | Keelan et al. |
| 2011/0069884 | A1 | 3/2011 | Zhang et al. |
| 2011/0280475 | A1 | 11/2011 | Singhal et al. |
| 2011/0293137 | A1 | 12/2011 | Gurman et al. |
| 2012/0007940 | A1 | 1/2012 | Michrowski et al. |
| 2012/0007942 | A1 | 1/2012 | Michrowski et al. |
| 2012/0069222 | A1 | 3/2012 | Steinberg et al. |
| 2012/0070097 | A1 | 3/2012 | Adams, Jr. |
| 2012/0098947 | A1 | 4/2012 | Wilkes |
| 2012/0106937 | A1 | 5/2012 | Molin et al. |
| 2012/0133639 | A1 | 5/2012 | Kopf et al. |
| 2012/0169849 | A1 | 7/2012 | Ferren |
| 2012/0177254 | A1* | 7/2012 | Lee et al. ............... 382/107 |
| 2012/0200726 | A1 | 8/2012 | Bugnariu |
| 2012/0242790 | A1 | 9/2012 | Sandrew et al. |
| 2013/0033582 | A1 | 2/2013 | Sun et al. |
| 2013/0094753 | A1 | 4/2013 | Voss et al. |
| 2013/0101206 | A1 | 4/2013 | Dedeoglu et al. |
| 2013/0113988 | A1 | 5/2013 | Wajs |
| 2013/0127823 | A1 | 5/2013 | Diverdi et al. |
| 2014/0086486 | A1 | 3/2014 | Pillman et al. |
| 2014/0184586 | A1 | 7/2014 | Kelley et al. |
| 2014/0185920 | A1 | 7/2014 | Kelley et al. |
| 2015/0154779 | A1 | 6/2015 | Kelley et al. |
| 2015/0279012 | A1 | 10/2015 | Brown et al. |
| 2015/0296122 | A1* | 10/2015 | Kelley ............... H04N 5/23212 348/349 |

FOREIGN PATENT DOCUMENTS

| | | |
|---|---|---|
| CN | 102842110 A | 12/2012 |
| EP | 0751674 A2 | 1/1997 |
| JP | 10-206150 | 8/1998 |
| JP | 2007128009 | 5/2007 |
| JP | 2010041299 A | 2/2010 |
| WO | 2009013682 A2 | 1/2009 |
| WO | 2010145499 A1 | 12/2010 |

OTHER PUBLICATIONS

Billiot et al., "3D Image Acquisition System Based on Shape From Focus Technique", Sensors, 2013, 13(4), pp. 5040-5053, <http://www.mdpi.com/1424-822011314/5040>.

"About Bayesian Belief Networks", bnet. builder, Last updated: Apr. 22, 2008, Copyright © 2004, Charles River Analytics, Inc., pp. 1-14, <https://www.cra.com/pdf/BNetBuilderBackground.pdf>.

"Focus Stacking & Depth of Field", Cambridge in Colour, Printed on: Jun. 29, 2015, © 2015, Cambridge in Colour, pp. 1-9, <http://www.cambridgeincolour.com/tutorials/focus-stacking.htm>.

"Guide to Image Sharpening", Cambridge in Colour, Printed on: Jun. 29, 2015, © 2015, Cambridge in Colour, pp. 1-11, <http://www.cambridgeincolour.com/tutorials/image-sharpening.htm>.

"Tutorials: Sharpness", Cambridge in Colour, Printed on: Jun. 29, 2015, © 2015, Cambridge in Colour, pp. 1-4, <http://www.cambridgeincolour/tutorials/sharpness.htm>.

Druchinin, Vitaly, "Anti Aliasing/Low Pass filter removal for sharper more detailed images", Life Pixel, Nov. 1, 2012, Printed on: Jun. 29, 2015, pp. 1-9, <http://www.lifepixel.com/blog/anti-aliasing-low-pass-filter-removal>.

"Close-up: Focusing Rails",EarthBound Light, Printed on: Jun. 29, 2015, Copyright © 2004, Bob Johnson, Earthbound Light, pp. 1-2, <http//www.earthboundlight.com/phototips/closeup-focusing-rail.html>.

Isidro,Raoul, "Nikon D5000 The Fun Guide", Raoul Isidro, retrieved on Sep. 5, 2013, pp. 1-13, <http://raoulisidro.com/page10.htm>.

Ok et al., "The Design of Service Management System Based on Policy-based Network Management", Networking and Services, 2006. ICNS '06. International conference, Silicon Valley, CA, © 2006, IEEE, 6 pages,<http://ieeexplore.ieee.org/xpl/articleDetails.jsp?arnumber=1690530&queryText=The+Design+of+Service+Management+System+based+on+Policybased+Network+Management&newsearch=true&searchField=Search_All>.

Bigelow, Ron, "Sharpening in Photoshop—Part II", Ron Bigelow, Retrieved on: Apr. 3, 2014, pp. 1-11, <http://www.ronbigelow.com/articles/sharpen2/sharpen2.htm>.

Bigelow, Ron, "Sharpening in Photoshop—Part V", Ron Bigelow, retrieved Dec. 13, 2013, pp. 1-23, <http://www.ronbigelow.com/articles/sharpen5/sharpen5.htm>.

"Focus Stacking Techniques for Extended Depth of Field", Spirit of Photography, retrieved on Sep. 5, 2013, pp. 1-14, <http://community.spiritofphotography.com/index.php?p.=22>.

Wesley, "The Nikon D800/E Autofocus Saga Continues", Nikon Fanboy, Aug. 22, 2012, Printed on: Jun. 29, 2015, pp. 1-6, <http://nikonfanboy.com/tag/asymmetric-focus>.

"Focus Stacking", Wikipedia, the free encyclopedia, last modified Nov. 9, 2013, retrieved on Mar. 31, 2014, pp. 1-3, <http://en.wikipedia.org/wiki/Focus_stacking>.

U.S. Appl. No. 14/231,281, "Automatic Focus Stacking of Captured Images", filed Mar. 3, 2014.

U.S. Appl. No. 14/248,396, "Real-Time Sharpening of Raw Digital Images", filed Apr. 9, 2014.

U.S. Appl. No. 14/588,476, "Automated Iterative Image-Masking Based on Imported Depth Information", filed Jan. 2, 2015.

Cutting, "Representing motion in a static image: constraints and parallels in art, science, and popular culture", Perception, 2002, vol. 31, pp. 116501193.

"Hyperfocal Distance Guide"; Hyperfocal Distance; Printed: Oct. 23, 2012; Copyright: 2002 Don Fleming; <http://www.dofmastercom/hyperfocal.html>.

Masuch et al., "Speedlines—Depicting Motion in Motionless Pictures", In: SIGGRAPH'99 Conference Abstracts and Applications, S. 277. ACM SIGGRAPH, 1999.

Meunier et al., Radar image modeling: A 3D Spectral domain approach; 0-8194-2211-8/96, SPIE vol. 2823; pp. 149-159.

"pCam Film+Digital Calculator", Printed: Oct. 23, 2012; <http://www.davideubank.com/Good_Focus/pCAM_Film +Digital_Calculator.html>.

Spitzer, "What is a Redshift", YouTube video, retrieved on Mar. 17, 2014 from website: <http://www.youtube.com/watch?v=FhfnqboacV0>.

U.S. Appl. No. 13/732,562, entitled "Image Selection and Masking Using Imported Depth Information", filed Jan. 2, 2013.

U.S. Appl. No. 13/732,577, entitled, "Depth of Field Visualization", filed on Jan. 2, 2013.

Wikipedia, "Redshift", retrieved on Mar. 17, 2014 from website: <http://en.wikipedia.org/w/index.php? title=Redshift>.

* cited by examiner

DISPLAYING RELATIVE MOTION OF OBJECTS IN AN IMAGE

FIELD OF THE INVENTION

The present invention relates generally to the field of photography, and more particularly to displaying motion along the Z axis of a static image.

BACKGROUND OF THE INVENTION

Light travels in waves that can stretch and compress when moving to and from a stationary observer. Each wave of light can be visualized as a sinusoidal wave. Each sinusoidal wave can be measured by its wavelength and frequency. Wavelength is the distance over which the wave's shape (e.g. sinusoidal) repeats. Wavelength can be measured by the distance between consecutive corresponding points of the same phase of the sinusoidal wave. For example, one can measure the distance between two peaks of a sinusoidal wave. Frequency is the number that a wave's shape (e.g. sinusoidal) repeats per a unit of time. For example, one can measure the number of sinusoidal waves in one minute.

When an object in motion moves away from a stationary observer, light waves are stretched. The stretched light waves exhibit a longer wavelength and lower frequency. This phenomenon is known as "redshift." Cosmological redshift is observed due to the expansion of the universe. Astronomers are able to use redshift to measure the distance between Earth and objects in space. When an object moves toward a stationary observer, light waves are compressed. The compressed light waves exhibit a shorter wavelength and higher frequency. This phenomenon is known as "blueshift."

SUMMARY

Aspects of embodiments of the present invention disclose a method, computer program product, and computer system for visualizing motion of an object in an image. The method includes receiving at least two images, including a first image and a second image, wherein each of the at least two images includes an object. The method further includes determining, by one or more processors, a first distance value for the object in the first image and a second distance value for the object in the second image, wherein each distance value is based on a distance between the object and an image capturing device. The method further includes comparing, by one or more processors, the first distance value to the second distance value to determine a difference between the first distance value and the second distance value. The method further includes generating, by one or more processors, an indication based on the determined difference between the first distance value and the second distance value.

DETAILED DESCRIPTION

A significant challenge in the field of photography is the display of motion along the Z axis. For example, it is challenging to depict the difference between the motion of an object moving away from a stationary image capturing device and the motion of an object moving toward a stationary image capturing device. Embodiments of the present invention display motion along the Z axis of an image using simulations that reflect exaggerated redshift and blueshift light shift properties.

Figure 1:
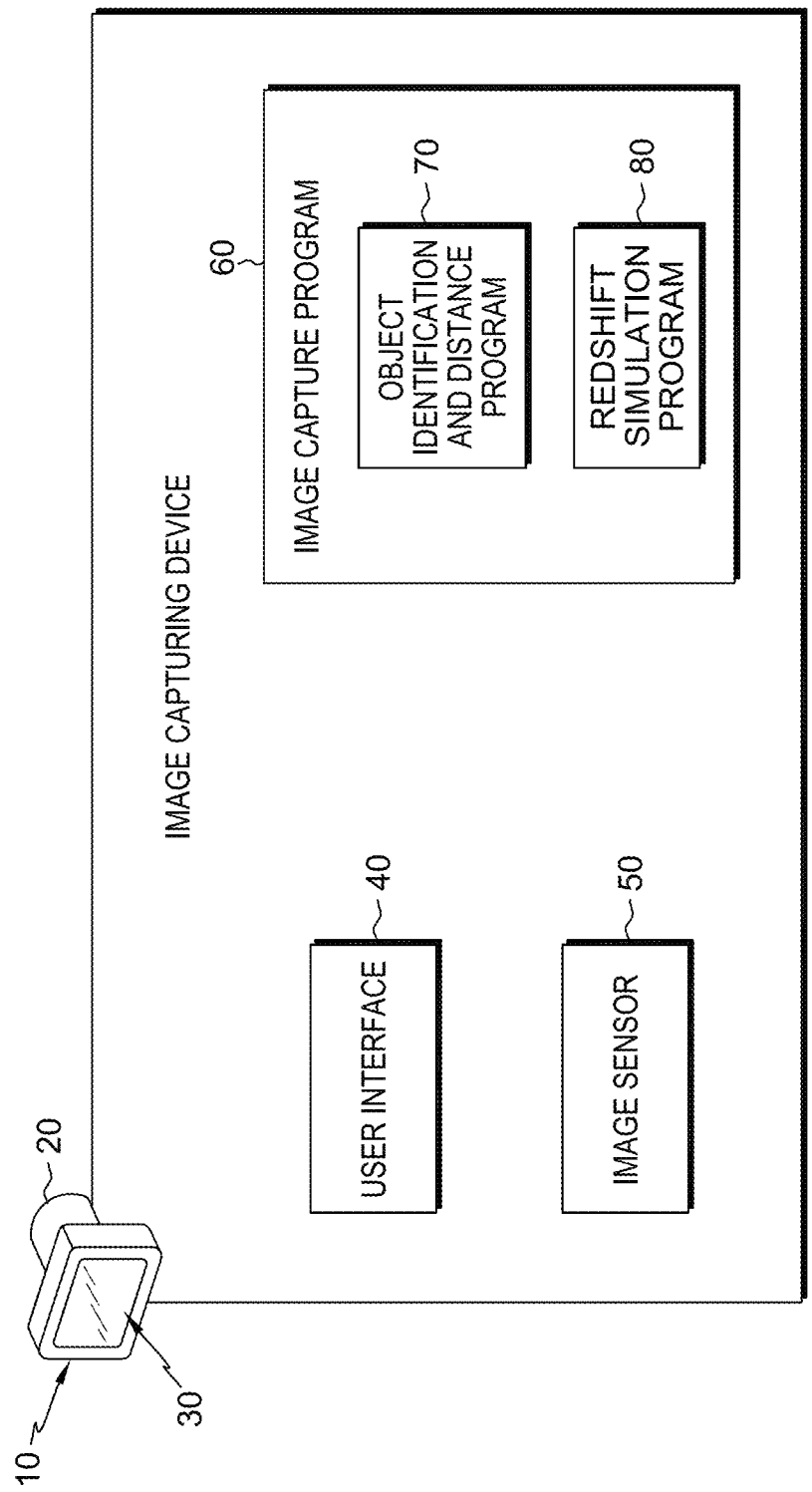
FIG. 1 is a functional block diagram of an image capturing device, in accordance with one embodiment of the present invention.

The present invention will now be described in detail with reference to the Figures. FIG. 1 is a functional block diagram of image capturing device 10, in accordance with one embodiment of the present invention. FIG. 1 provides only an illustration of one embodiment and does not imply any limitations with regard to the environments in which different embodiments may be implemented.

In the depicted embodiment, image capturing device 10 is a computing device integrated with an imaging device. For example, image capturing device 10 can be a digital camera, such as a digital single lens reflex camera (dSLR), having computer processing capabilities or, alternatively, an imaging device in communication with a separate distinct computing device. In other embodiments, image capturing device 10 may be a digital video camera, a computer with an integrated digital camera, a smart phone equipped with a digital camera, or any programmable electronic device capable of capturing and displaying digital images. Digital images may be still photographs or moving images such as videos or movies. Image capturing device 10 includes optical lens 20, display 30, user interface (UI) 40, image sensor 50, image capture program 60, object identification and distance program 70, and redshift simulation program 80. Image capturing device 10 may include internal and external components as depicted in further detail with respect to FIG. 4.

Optical lens 20 is integrated with image capturing device 10. In one embodiment, optical lens 20 is an interchangeable dSLR lens. For example, optical lens 20 may be a 30 mm interchangeable dSLR lens. In another embodiment, optical lens 20 may be permanently fixed to image capturing device 10. For example, optical lens 20 is permanently fixed when image capturing device 10 is a digital point and shoot camera. Optical lens 20 operates to focus light onto image sensor 50.

The aperture (not shown) is the opening through which light travels through optical lens 20 and into image capturing device 10. The aperture may be located in different locations within optical lens 20. For example, the aperture may be a ring or other fixture that holds an optical element in place, or it may be a diaphragm placed in the optical path to limit the amount of light that passes through the lens. The aperture may be adjusted to control the amount of light entering image capturing device 10.

Display 30 is connected to image capturing device 10. In one embodiment, display 30 is a liquid crystal display (LCD) fixed to image capturing device 10. In another embodiment, display 30 is a display monitor connected to a computer with an integrated digital camera. In another embodiment, display 30 is a display monitor connected to a network, or LAN. In yet another embodiment, display 30 is a monitor attached to image capturing device 10 via a cable. Display 30 operates to display a digital image captured by image capturing device 10. A digital image is comprised of a set of pixels. In one embodiment, a digital image may be a still image. In another embodiment, a digital image may be a digital video.

UI 40 operates on image capturing device 10 and works in conjunction with display 30 to visualize content such as images captured by image capturing device 10. UI 40 may comprise one or more interfaces such as an operating system interface and application interfaces. In one embodiment, UI 40 comprises an interface to image capture program 60 and object identification and distance program 70. In one embodiment, UI 40 receives an image captured by image capturing program 60 and sends the image to display 30.

Image sensor 50 is integrated with image capturing device 10. Image sensor 50 is a detector that converts an optical image into an electronic signal. The electrical signals are quantized by an analog-to-digital (A/D) converter (not shown). In one embodiment, image sensor 50 may be a charge-coupled device (CCD) sensor. In another embodiment, image sensor 50 may be a complementary metal-oxide semiconductor (CMOS) sensor or another type of sensor. In yet another embodiment, image sensor 50 could be a specialized sensor for medical imaging.

In one embodiment, light passes through optical lens 20 and reaches image sensor 50, which contains an array of pixel sensors that are evenly distributed across image sensor 50. A pixel sensor may be comprised of a semiconductor material that absorbs light photons and generates electronic signals. In one embodiment, image sensor 50 may also contain autofocus pixel sensors. The autofocus pixel sensors may be an array of pixel sensors that are arranged in various patterns. In another embodiment, the autofocus pixel sensors may be contained on a sensor that is separate from image sensor 50.

Image capture program 60 is a standard image capture program. For example, image capture program 60 is a program operating on a digital camera, such as Nikon® Scene Recognition System. In one embodiment, image capture program 60 receives and processes electronic signals from image sensor 50. Image capture program 60 sends the processed image to UI 40 for display on display 30.

In one embodiment, image capture program 60 also manages autofocus capabilities of image capturing device 10. Autofocus capabilities utilize one or more autofocus pixel sensors to determine if the image is in focus and electromechanically adjusts the focus of image capturing device 10 if the image is not in focus. The user may use UI 40 to operate image capture program 60 to select one or more focus points to set the photographer's focus point in the field of view of image capturing device 10. A focus point is a location in the field of view of image capture device 10 associated with an autofocus pixel sensor. Image capture program 60 then determines if the subject matter at the single focus point is in focus. If the subject matter at the single focus point is not in focus, then image capture program 60 electromechanically adjusts the focus until the subject matter is in focus.

If the autofocus program utilizes active autofocus, image capturing program 60 may use ultrasonic waves or triangulation of infrared light to determine the distance between the subject and sensor 50. Active autofocus is a type of autofocus that determines correct focus by measuring distance to the subject independently of the optical system. In one embodiment, an ultrasonic wave detector (not shown) may be used to determine distance. In another embodiment, an infrared light detector (not shown) may be used to determine distance. In yet another embodiment, another method may be used to determine distance. If the autofocus program utilizes passive autofocus, image capture program 60 may use phase detection or contrast measurement to determine focus. Passive autofocus is a type of autofocus that determines correct focus by performing a passive analysis of the image that is entering the optical system. In one embodiment, image capture program 60 may be able to detect motion of the subject matter toward or away from the camera while maintaining focus on the subject matter.

In one embodiment, phase detection may also determine distance between the subject matter at a focus point and an autofocus pixel sensor associated with the focus point. Phase detection may function in a way similar to a rangefinder, which is a focusing mechanism that allows the user to measure the distance to the subject matter. A rangefinder shows two identical images. One image moves when a calibrated wheel on the image capturing device is turned. After the two images overlap and fuse into one, the distance is read off the calibrated wheel. For example, when utilizing phase detection, image capturing device 10 contains a beam splitter (not shown) that captures light from opposite sides of the lens and diverts light to autofocus sensors located separately from image sensor 50. This generates two separate images which are compared for light intensity and separation error in order to determine whether the image is in or out of focus. During this comparison, phase detection is used to determine the distance between the subject matter at a focus point to the associated autofocus pixel sensor. For example, digital cameras measure distance to the subject matter electronically.

In one embodiment, a user operating image capturing device 10 uses UI 40 to select redshift simulation program 80 prior to capturing an image. In some embodiments, image capture program 60 receives an indication that redshift simulation program 80 has been selected. In some embodiments, image capture program 60 receives an instruction from redshift simulation program 80 to automatically capture a sequence of a specific number of images. For example, image capture program 60 receives an instruction from redshift simulation program 80 to automatically capture a sequence of two images. Image capture program 60 captures the sequence of two images. In one embodiment, image capture program 60 sends image data for each of the two captured images to object identification and distance program 70. In another embodiment, image capture program 60 sends image data for each of the two captured images to redshift simulation program 80. In one embodiment, image data includes data required to calculate depth of field such as the aperture diameter, the focal length of optical lens 20, and the distance between a subject at a focus point and an autofocus pixel sensor associated with the focus point by using autofocus capabilities of image capture program 60. Image data may also include distances to a plurality of focus points from image capturing device 10. In some embodiments, image data may also include a time stamp for each captured image. A time stamp is a sequence of characters or encoded information identifying when each image was captured. For example, a time stamp may include the date and/or time of day. A time stamp may be accurate to a fraction of a second.

Object identification and distance program 70 operates to visualize the depth of field of each image captured by image capture program 60. In one embodiment, object identification and distance program 70 receives image data from image capture program 60. Object identification and distance program 70 determines the depth of field of each captured image based on the image data. Object identification and distance program 70 causes the depth of field to be displayed in UI 40 of image capturing device 10. In one embodiment, object identification and distance program 70 creates a distance map for the image. For example, object identification and distance program 70 may create a distance map, wherein the distance map determines a distance value for each focus point of the image. In one embodiment, object identification and distance program 70 sends image data, including the distance map, to image capture program 60.

As depicted, object identification and distance program 70 is a sub-program or routine of image capture program 60. In another embodiment, object identification and distance program 70 may be an independent program capable of communicating with image capture program 60 and redshift simulation program 80.

Redshift simulation program 80 operates to display motion along the Z axis of an image using simulations that reflect exaggerated redshift and blueshift light shift properties. In one embodiment, redshift simulation program 80 receives image data, including a distance map, for each captured image from image capture program 60. In one embodiment, the distance map includes distance data for each captured image. Distance data may include the distance between each object at each focus point to image capturing device 10. Redshift simulation program 80 compares distance data for each respective focus point in each captured image.

In some embodiments, redshift simulation program 80 may determine that the distance data associated with an object at a focus point has increased in each successive captured image. Based on the determination that the distance data associated with the object has increased, redshift simulation program 80 determines that the object associated with the focus point is moving away from image capture device 10. Redshift simulation program 80 applies redshift to the focus point associated with the object. For example, redshift simulation program 80 applies a mask that is red in color to the applicable focus point(s). Alternatively, redshift simulation program 80 may determine that the distance data associated with an object at a focus point has decreased in each successive captured image. Based on the determination, redshift simulation program 80 determines that the object associated with the focus point is moving toward image capture device 10. Redshift simulation program 80 applies blueshift to the focus point associated with the object. For example, redshift simulation program 80 applies a mask that is blue in color to the applicable focus point(s).

Figure 2A:
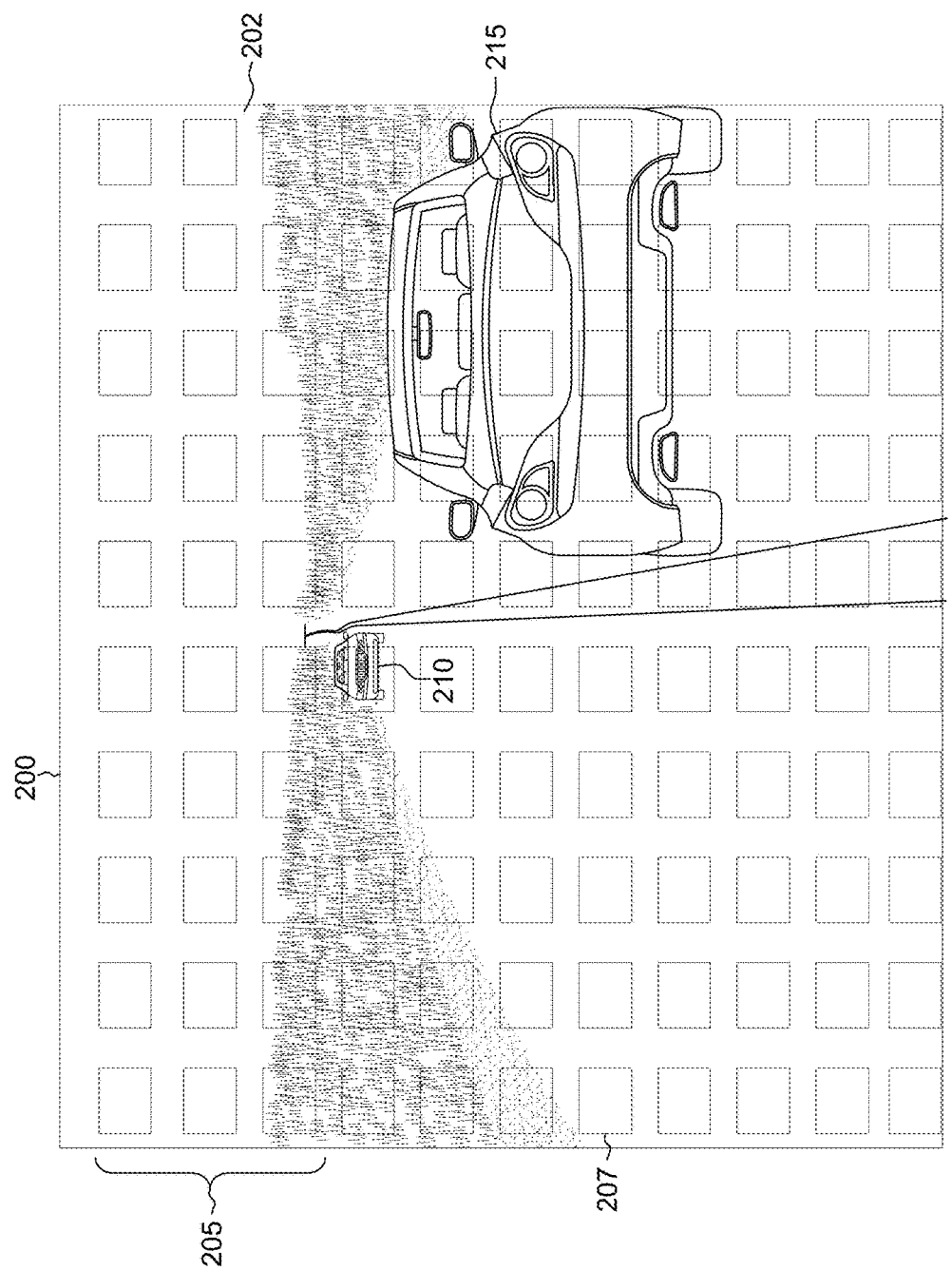
FIG. 2A is an exemplary illustration for an image capturing program of a first image captured by the image capturing device of FIG. 1, in accordance with one embodiment of the present invention.
Figure 2B:
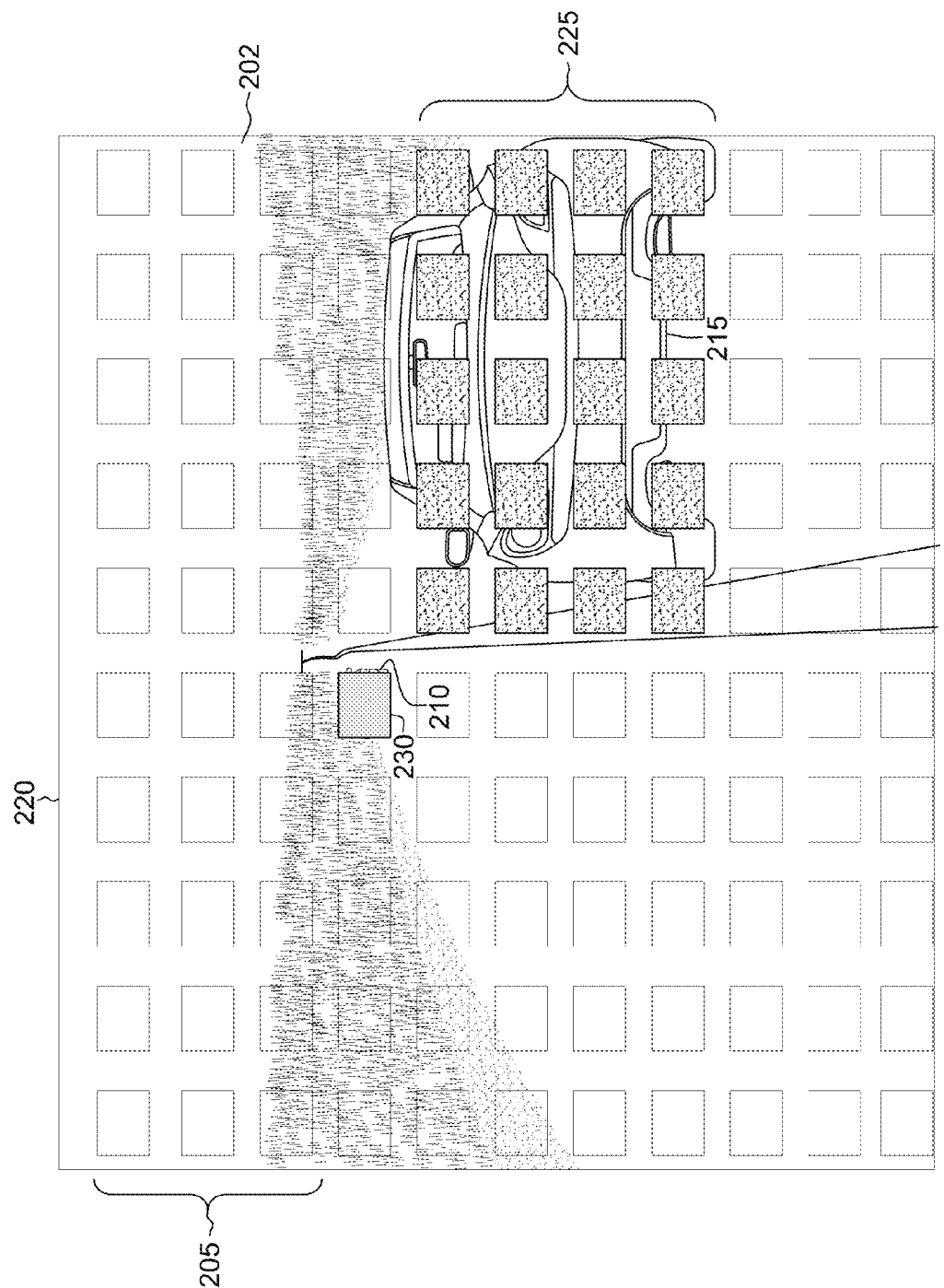
FIG. 2B is an exemplary illustration for the first image as affected by a redshift simulation program for display motion along the Z axis of an image, in accordance with one embodiment of the present invention.
Figure 2C:
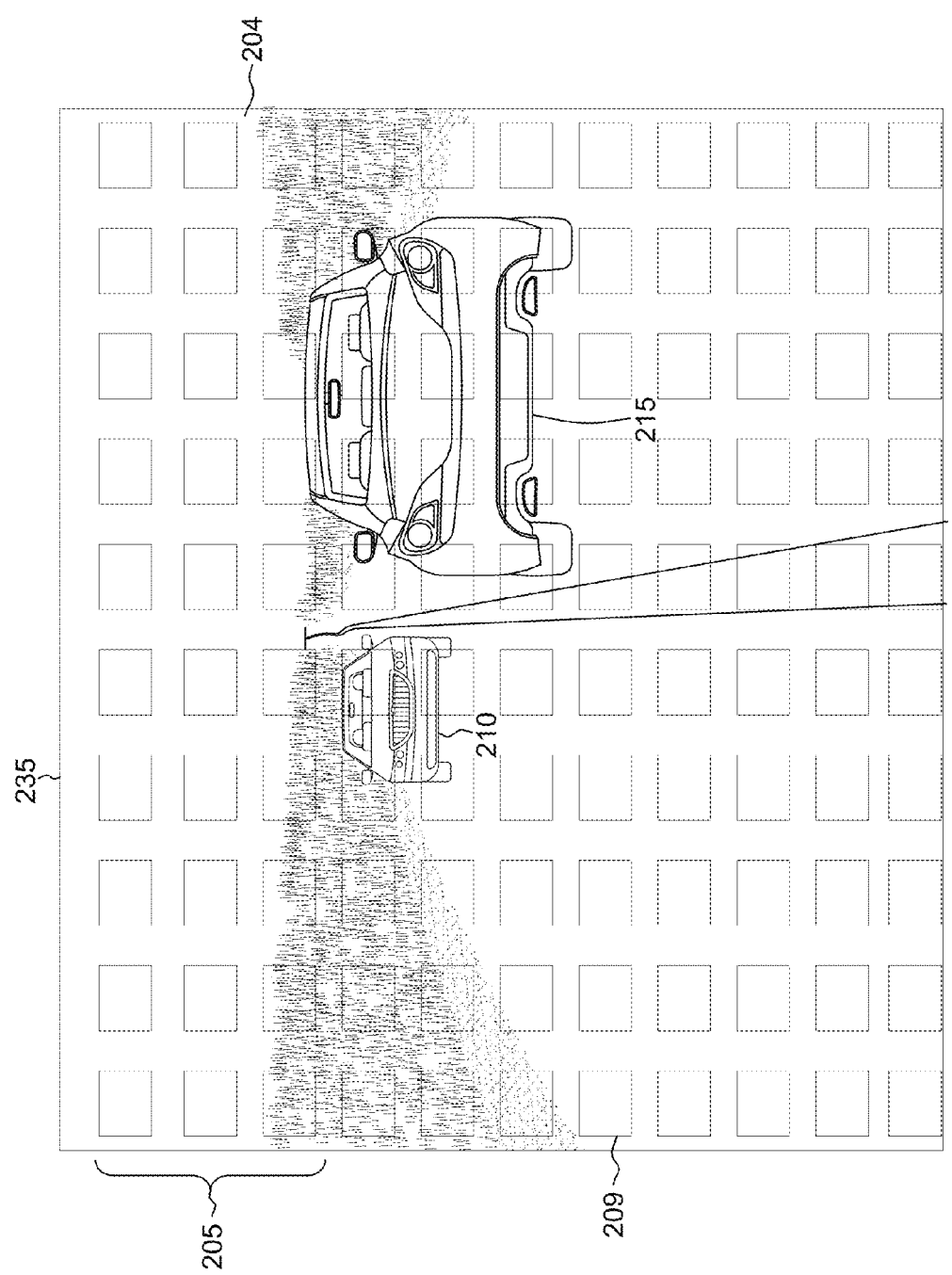
FIG. 2C is an exemplary illustration for an image capturing program of a second image captured by the image capturing device of FIG. 1, in accordance with one embodiment of the present invention.
Figure 2D:
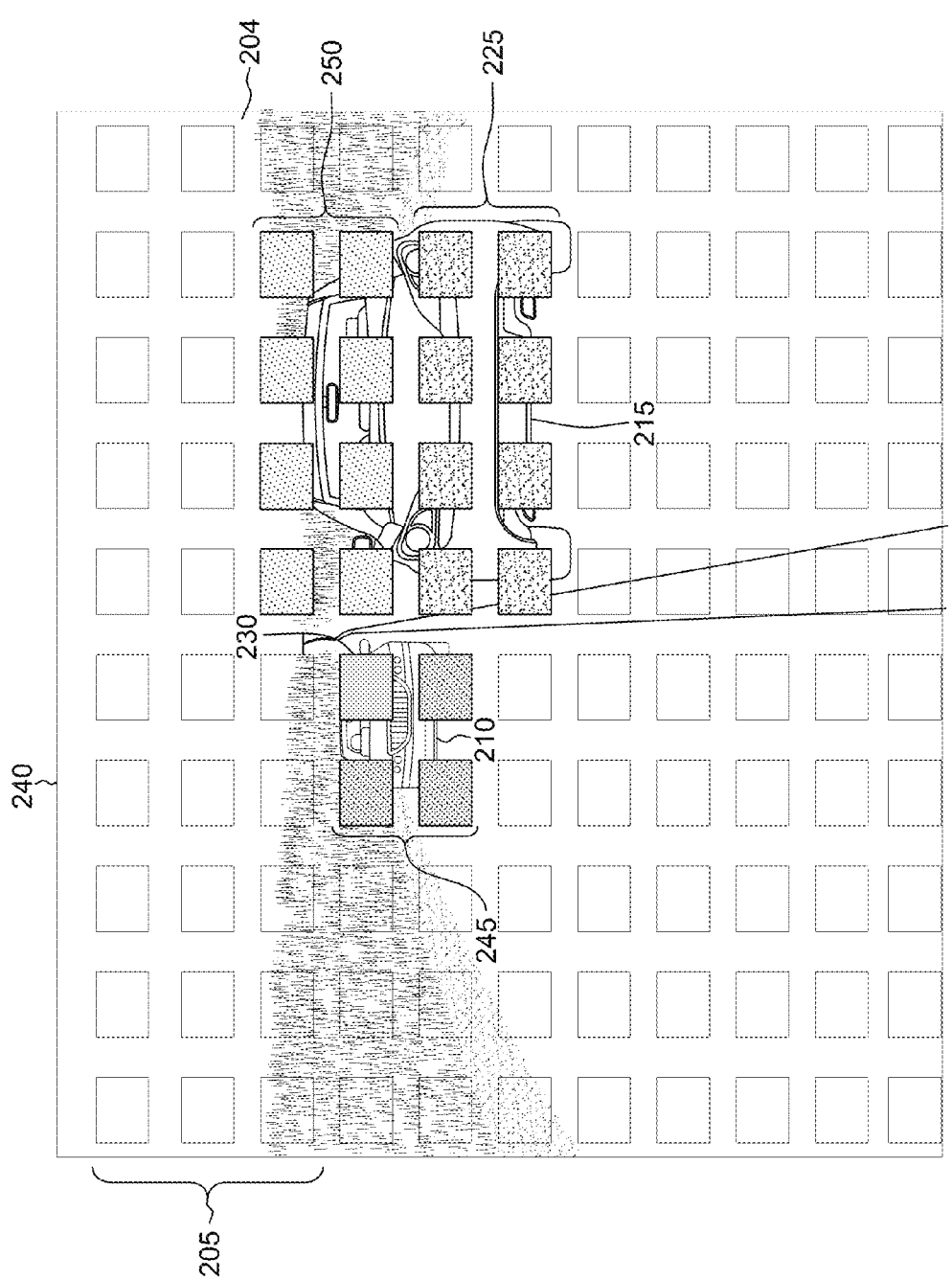
FIG. 2D is an exemplary illustration for the second image as affected by a redshift simulation program for display motion along the Z axis of an image, in accordance with one embodiment of the present invention.
Figure 2E:
FIG. 2E is an exemplary view of the user interface for the first image as affected by a redshift simulation program for displaying the relative motion of objects along the Z axis of the image, in accordance with one embodiment of the present invention.

FIGS. 2A-2E depict an illustrated example application of image capture program 60 and redshift simulation program 80, in accordance with one embodiment of the present invention. UI 200 of FIG. 2A, UI 220 of FIG. 2B, UI 235 of FIG. 2C, UI 240 of FIG. 2D, and UI 255 of FIG. 2E are each examples of UI 40 of FIG. 1 and, in the depicted embodiment, allow a user to see content displayed by image capture program 60 and redshift simulation program 80. In some embodiments, the depicted UIs represent automatic steps performed by image capture program 50 and redshift simulation program 80. Automatic steps may not be presented to the user of image capturing device 10.

In one embodiment, initially, a user operating image capturing device 10 positions image capturing device 10 such that image capturing device 10 is facing subject matter to be captured in an image. In one embodiment, the user selects settings for redshift simulation program 80. For example, the user may select a setting that causes image capture program 60 to automatically capture two images when redshift simulation program 80 is selected. In such an example, the user indicates that a second image will be captured five seconds after a first image is captured. The user, using UI 40, selects redshift simulation program 80. The user, using UI 40, captures a first image of an object. Image capture program 60 causes a second image to be captured five seconds after the first image is captured. In one embodiment, image capture program 60 prompts the user to manually capture the second image five seconds after the first image is captured. In another embodiment, image capture program 60 automatically causes the second image to be captured five seconds after the first image is captured. Image capture program 60 receives image data for both captured images.

FIG. 2A depicts a display of UI 200 which depicts a preview of a first captured image received by image capture program 60. Image 200 is a preview of the first captured image. Focus points 205 are locations within the field of view of image capturing device 10. Each focus point of focus points 205 is associated with an autofocus pixel sensor. Each of the focus points shown in FIG. 2A is included with focus points 205. Embodiments of the present invention may include a greater or fewer number of focus points 205 than depicted in FIGS. 2A-2E. In the depicted embodiment, focus points 205 are arranged in a Cartesian coordinate plane. Each focus point can be identified according to the x,y axes of the Cartesian system. For example, the x,y coordinates of focus point 207 are 1,5 when the origin, i.e., point (0, 0), is located at the bottom left of the field of view of image capturing device 10.

In the depicted embodiment, image 202 includes two cars driving down a road in opposite directions. Image 202 includes object 210 and object 215. The first car, i.e., object 210 is moving toward image capturing device 10. The second car, i.e., object 215 is moving away from image capturing device 10. Object 210 appears to be located further from image capturing device 10. Object 215 appears to be located closer to image capturing device 10.

In one embodiment, image capture program 60 sends image data for the first captured image to object identification and distance program 70. Object identification and distance program 70 receives image data for the first captured image from image capture program 60. Object identification and distance program 70 creates a distance map for the first captured image. The distance map includes a distance value for each focus point and boundaries of each object in each captured image. In one embodiment, object identification and distance program 70 sends image data, including the distance map, for the first captured image to image sharpening program 80.

FIG. 2B depicts a display of UI 220 when redshift simulation program 80 is operating on image capturing device 10. UI 220 displays image 202. In one embodiment, redshift simulation program 80 receives image data, including the distance map, for the first image from object identification and distance program 70. The image shown in UI 220 is the same image shown in UI 200 of FIG. 2A.

Redshift simulation program 80 determines distance data for each focus point. In one embodiment, redshift simulation program 80 determines distance data from the distance map. In another embodiment, redshift simulation program 80 determines distance data from other image data. In the depicted embodiment, redshift simulation program 80 determines that focus point 230 (indicated by a first dark mask), which is associated with object 210, is 100 meters away from image capturing device 10. Redshift simulation program 80 also determines that focus points 225 (indicated by a second light mask), which are associated with object 215, are each 10 meters away from image capturing device 10.

FIG. 2C depicts a display of UI 235 which depicts a preview of a second captured image received by image capture program 60. Image 204 was captured five seconds after the first image was captured. As depicted by image 202, image 204 also includes object 210 and object 215. In the depicted embodiment focus point 209 shares the same x,y coordinates as focus point 207 in FIG. 2A. Redshift simulation program 80 determines that the focus points in each of the captured images that share x,y coordinates are related focus points. For example, redshift simulation program 80 determines that focus point 209 and focus point 207 in FIG. 2A are related.

FIG. 2D depicts a display of UI 240 when redshift simulation program 80 is operating on image capturing device 10. UI 240 displays the second captured image. In one embodiment, redshift simulation program 80 receives image data, including a distance map, for the second image from image capture program 60. The image shown in UI 240 is the same image shown in UI 235 of FIG. 2C.

Redshift simulation program 80 determines distance data for each focus point. Redshift simulation program 80 determines that an object associated with focus point 230 (e.g. object 210) is 50 meters away from image capturing device 10. Redshift simulation program 80 also determines that object 210 associated with focus points 245 Focus points 245 are indicated by a third mask. The third mask represents focus points in image 204 that are associated with object 210 that were not associated with object 210 in image 202. In the depicted embodiment, the third mask is indicated by a dark spotted pattern. Redshift simulation program 80 determines that an object associated with focus points 225 (e.g. object 215) is 20 meters away from image capturing device 10. Redshift simulation program 80 also determines that an object associated with focus points 250 (e.g. object 215) is 20 meters away from image capturing device 10. Focus points 250 are indicated by a fourth mask. The fourth mask represents focus points in image 204 that are associated with object 215 that were not associated with object 210 in image 202. In the depicted embodiment, the fourth mask is indicated by a light spotted pattern.

Redshift simulation program 80 compares the distance data for each focus point in the second image to the distance data for the related focus points in the first image. In one embodiment, redshift simulation program 80 uses the time stamp for each captured image to determine the time at which each image is captured and the chronological order of the captured images. In another embodiment, redshift simulation program 80 determines the sequence of captured images from the order in which the images were received.

Redshift simulation program 80 determines that the distance data for focus point 230, focus points 245, focus points 225, and focus points 250 are different than the distance data for the related focus points for the first captured image. Redshift simulation program 80 compares the distance data (i.e., fifty meters) for focus point 230 and focus points 245 to their related focus points in the first image (i.e., one-hundred meters). The distance data for the focus points related to focus point 230 in the first image is one-hundred meters, which is the starting distance for car 210. Redshift simulation program 80 determines that the difference in distance data between focus point 230 in the second image, which is fifty meters, and focus points 230 in the first image, which is one-hundred meters, is a fifty meter decrease in distance, suggesting that object 210 is fifty meters closer to image capturing device 10 in image 204 than in image 202. Redshift simulation program 80 may determine that focus point 230 and focus points 245 are associated with the same object because of their proximity and distance data. Redshift simulation program 80 determines that an object associated with focus point 230 and focus points 245 (e.g. object 210) has moved fifty meters toward image capturing device 10 in five seconds at a rate of ten meters per second.

In similar fashion, redshift simulation program 80 compares the distance data for focus points 225 and 250 to their related focus points in the first image. The distance data for the focus points related to focus points 225 in the first image is ten meters, which is the starting distance for object 215. Redshift simulation program 80 determines that the difference in distance data between focus points 225, which is twenty meters, and their related focus points in the first image, which is ten meters, is a ten meter increase in distance, indicating that object has moved ten meters. Redshift simulation program 80 determines that, focus points 225 and focus points 250 are associated with the same object because of their proximity and distance data. Redshift simulation program 80 determines that an object associated with focus point 230 and focus points 245 (e.g. object 215) has moved ten meters away from image capturing device 10 in five seconds at a rate of two meters per second.

FIG. 2E depicts a display of UI 255 when redshift simulation program 80 is operating on image capturing device 10. UI 255 displays the first image received from image capture program 60. As described above, redshift simulation program 80 determined that focus point 230, which represents object 210, is moving toward image capturing device 10 at a rate of 10 meters per second. Redshift simulation program 80 applies blueshift to focus point 230. In the depicted embodiment, redshift simulation program 80 applies a mask to focus point 230 that indicates blueshift.

As described above, redshift simulation program 80 determined that focus points 225, which represent object 215, is moving away from image capturing device at a rate of two meters per second. Redshift simulation program 80 applies redshift to focus points 225. In the depicted embodiment, redshift simulation program 80 applies a mask to focus points 225 that indicates redshift.

Figure 3:
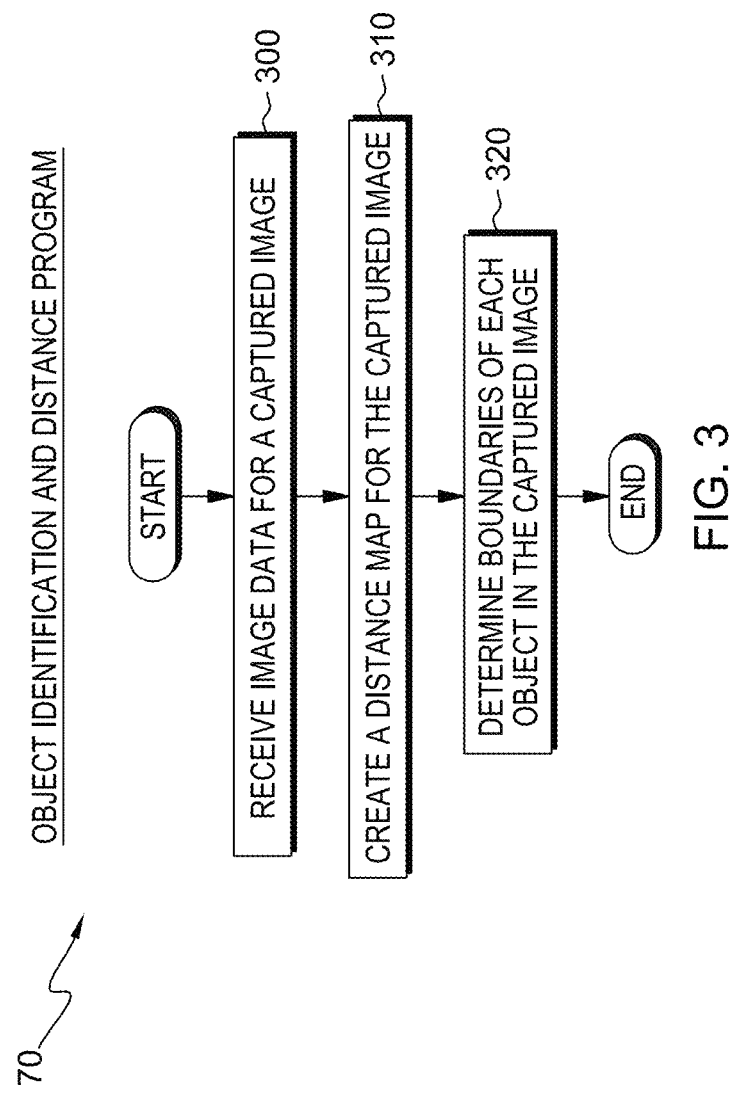
FIG. 3 is a flowchart depicting the steps of the depth of field program, in accordance with one embodiment of the present invention.

FIG. 3 is a flowchart depicting operational steps of object identification and distance program 70 for creating a distance map for a captured image, in accordance with an embodiment of the present invention.

In one embodiment, the user selects the photographer's focus point in the field of view. In one embodiment, initially, light passes through lens 20. Image sensor 50 absorbs light, converts it into an electronic signal, and sends the signal to image capture program 60. Image capture program 60 receives the electronic signal from image sensor 50. Image capture program 60 adjusts autofocus to bring the subject matter at the photographer's focus point into focus. Image capture program 60 determines a distance between subject matter at a focus point and an autofocus pixel sensor associated with the focus point for each focus point in a plurality of focus points. In one embodiment, image capture program 60 determines image data, which includes data required to calculated depth of field such as aperture diameter, focal length of optical lens 20, and the distance between the subject matter at the photographer's focus point and the autofocus pixel sensor associated with the photographer's focus point by using the image capture program's autofocus capabilities. Image data also includes the distance between subject matter at a focus point and an autofocus pixel sensor associated with the focus point for each focus point in a plurality of focus points. In one embodiment, image capture program 60 sends some or all of the image data to object identification and distance program 70.

In one embodiment, image capture program 60 causes the captured image to be displayed on display 30. In another embodiment, image capture program 60 sends the captured image to object identification and distance program 70.

In step 300, object identification and distance program 70 receives image data. In one embodiment, object identification and distance program 70 receives image data from image capture program 60. In another embodiment, object identification and distance program 70 may access the autofocus capabilities of image capture program 60 and determine image data. Image data includes data required to calculate distance such as aperture diameter, focal length of optical lens 20, and the distance between the subject matter at the photographer's focus point and the autofocus pixel sensor associated with the photographer's focus point.

In step 310, object identification and distance program 70 creates a distance map for the captured image. In one embodiment, a distance map represents distance values between subject matter associated with focus points of the captured image. Each focus point is representative of one or more pixels of the captured image. Each distance value associated with each focus point is also associated with the one or more pixels represented by each focus point. For example, object identification and distance program 70 determines that the distance value for a focus point is fifty meters. Object identification and distance program 70 determines that the distance between subject matter associated with the focus point is fifty meters. Object identification and distance program 70 also determines that the distance value for the pixels represented by the focus point is fifty meters.

In one embodiment, object identification and distance program 70 determines that subject matter associated with one or more adjacent focus points is also associated with pixels of the image that are between the one or more adjacent focus points and are not associated with a specific focus point. Object identification and distance program 70 assigns a distance value to pixels between adjacent focus points that share the same distance. Object identification and identification program 70 assigns the distance value for the adjacent focus points to the pixels between the focus points.

In step 320, object identification and distance program 70 determine boundaries of each object in the captured image. In one embodiment, object identification and distance program 70 determines that at least two adjacent focus points that share a distance value represent the same object. In one embodiment, object identification and distance program 70 also determines that the pixels between the at least two adjacent focus points that share the same distance value represent the same object that the focus points represent. In one embodiment, object identification and distance program 70 determines that the pixels between adjacent focus points that have different distance values represent edges of the respective objects represented by each of the adjacent focus points.

In another embodiment, object identification and distance program 70 overlays at least two adjacent focus points that share a distance value with a bounding mask. For example, object identification and distance program 70 overlays an opaque mask over the at least two adjacent focus points that share a distance value and the pixels between the adjacent focus points. In another example, object identification and distance program 70 overlays a patterned mask over the at least two adjacent focus points that share a distance value and the pixels between the adjacent focus points. In yet another embodiment, object identification and distance program 70 uses another method to indicate the boundary of the at least two adjacent focus points that share a distance value and the pixels between the focus points. In one embodiment, object identification and distance program 70 sends the determined boundaries to redshift simulation program 80.

Figure 4:
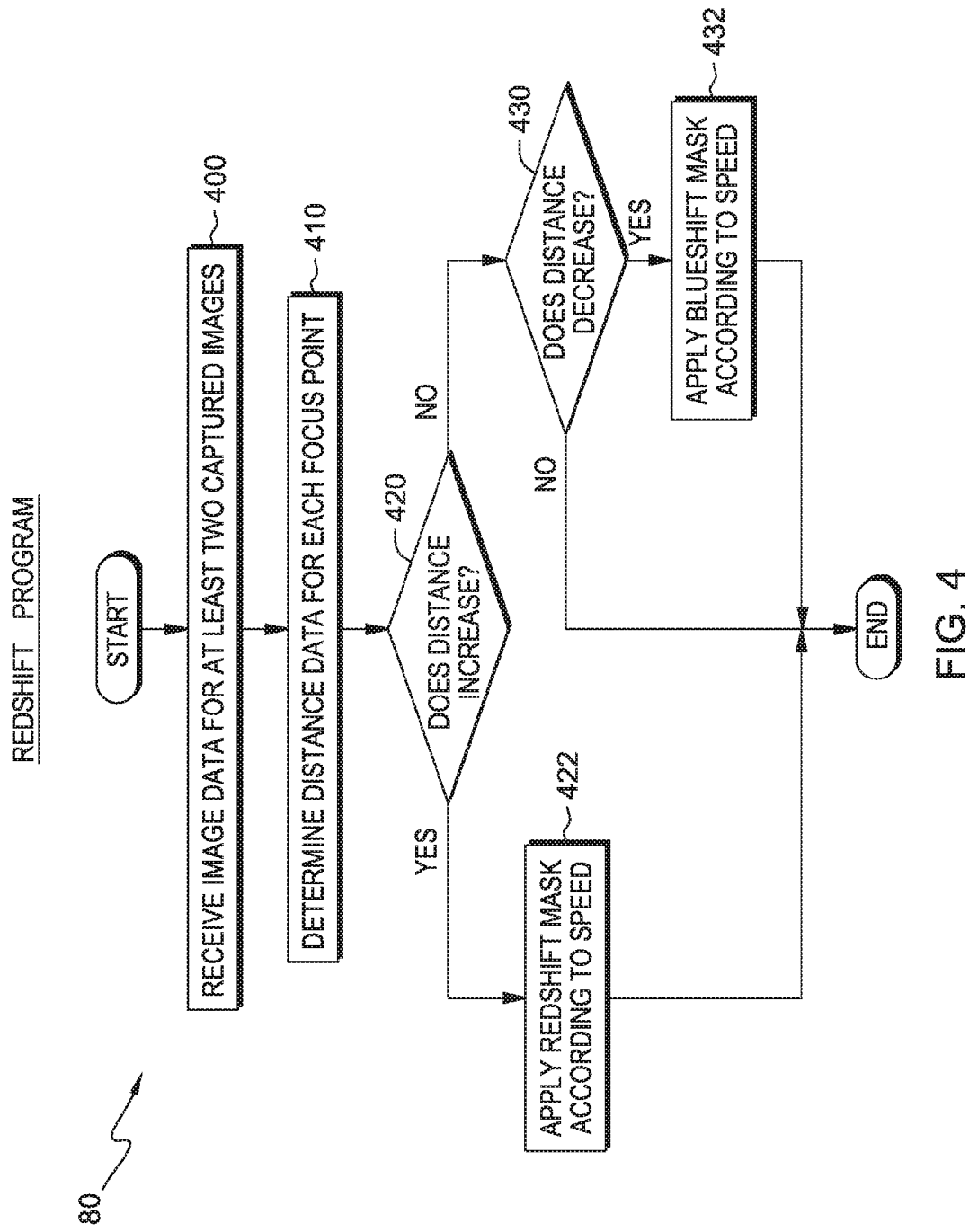
FIG. 4 is a flowchart depicting the steps of the redshift simulation program, in accordance with one embodiment of the present invention.

FIG. 4 is a flowchart depicting operational steps of redshift simulation program 80 for displaying motion along the Z axis of an image captured by image capturing device 10, in accordance with one embodiment of the present invention.

In one embodiment, initially, a user operating image capturing device 10 positions image capturing device 10 such that image capturing device 10 is facing subject matter to be captured in an image. The user, using UI 40, selects redshift simulation program 80. In one embodiment, in a prior step, the user has selected settings for redshift simulation program 80. For example, the user has selected a setting that causes image capture program 60 to automatically capture two images when redshift simulation program 80 is selected. The user, using image capturing device 10, captures a first image of an object. Image capture program 60 causes a second image to be captured according to the selected settings for redshift simulation program 80.

In one embodiment, image capture program 60 sends image data for each captured image to object identification and distance program 70. Object identification and distance program 70 receives image data for each captured image from image capture program 60. Object identification and distance program 70 creates a distance map for each image. In one embodiment, object identification and distance program 70 sends image data, including a distance map, for each captured image to redshift simulation program 80. In another embodiment, object identification and distance program 70 sends a distance map for each captured image to image capture program 60. Image capture program 60 receives each distance map. Image capture program 60 sends image data, including a distance map, for each captured image to redshift simulation program 80.

In step 400, redshift simulation program 80 receives image data for at least two captured images. In one embodiment, redshift simulation program 80 receives the image data from image capturing program 60. In another embodiment, redshift simulation program 80 receives the image data from object identification and distance program 70. In one embodiment, image data includes a distance map for each of the at least two captured images.

In step 410, redshift simulation program 80 determines distance data for each focus point. Redshift simulation program 80 determines distance data for each focus point in each captured image. In one embodiment, redshift simulation program 80 uses a distance map for each captured image to determine distance data for each focus point. As previously described, each distance map includes a distance value for each focus point and boundaries of each object in each captured image. In another embodiment, redshift simulation program 80 uses image data, such as aperture diameter, focal length of optical lens 20, and the distance between the subject matter at the photographer's focus point and the autofocus pixel sensor associated with the photographer's focus point, of each captured image to determine distance data for each focus point.

Redshift simulation program 80 determines if distance data for each set of related focus points increases (decision 420). In one embodiment, redshift simulation program 80 compares the distance data for each captured image. For example, redshift simulation program 80 compares distance data for each set of related focus points. Related focus points are two focus points that share the same location coordinates in two different captured images, as described in FIG. 2C.

In one embodiment, redshift simulation program 80 uses timestamps for each image to determine the sequence of the related focus points. Redshift simulation program 80 determines from the timestamp of the second captured image that the distance data of the second captured image represents the final distance of the subject material associated with the related focus points. If redshift simulation program 80 determines that the distance data for the second image is greater than the distance data for the first image, redshift simulation program 80 determines that the distance data is increasing and proceeds to step 422 (decision 420, Yes branch). If redshift simulation program 80 determines that the distance data for the second image is not greater than the distance data for the first image, redshift simulation program 80 proceeds to decision 430 (decision 420, No branch).

In step 422, redshift simulation program 80 applies redshift according to speed. In one embodiment, redshift simulation program 80 applies redshift to focus points of the first image that have smaller distance values than their related focus points. In another embodiment, redshift simulation program 80 applies redshift to focus points of the second image that that have greater distance values than their related focus points. In one embodiment, redshift simulation program 80 determines the speed at which the subject matter associated with the related focus points is moving away from image capturing device 10. In one embodiment, redshift simulation program 80 applies redshift mask based on the speed at which the subject matter is moving away from image capturing device 10. In one embodiment, redshift simulation program 80 applies a dark red mask to objects that are moving at a speed that is above a pre-defined speed threshold. Redshift program 80 applies a light red mask to objects that are moving at a speed that is below a pre-defined speed threshold. In another embodiment, redshift simulation program 80 applies redshift to objects of an image based on the relative speeds of the objects. In such an embodiment, redshift simulation program 80 applies a mask of a darker shade of red to the object that is moving away from image capturing device 10 at the fastest speed, when compared to the shade of red applied to the other objects in the image.

In another embodiment, redshift simulation program 80 applies a mask of a different color to focus points of the first image that have smaller distance values than their related focus points. In yet another embodiment, redshift simulation program 80 applies a mask of a specific pattern to focus points of the first image that have smaller distance values than their related focus points.

In decision 430, redshift simulation program 80 determines if distance data for each set of related focus points is decreasing. In one embodiment, redshift simulation program 80 compares the distance data for each captured image. If redshift simulation program 80 determines that the distance data for the first image is greater than the distance data for the second image, redshift simulation program 80 proceeds to step 432 (decision 430, Yes branch). If redshift simulation program 80 determines that the distance data for the first image is not greater than the distance data for the second image, redshift simulation program 80 ends (decision 430, No branch).

In step 432, redshift simulation program 80 applies blueshift according to speed. In one embodiment, redshift simulation program 80 applies blueshift to focus points of the first image that have greater distance data values than their related focus points. In another embodiment, redshift simulation program 80 applies blueshift to focus points of the second image that have smaller distance data values than their related focus points.

In one embodiment, redshift simulation program 80 determines the speed at which the subject matter associated with the related focus points is moving away from image capturing device 10. In one embodiment, redshift simulation program 80 applies blueshift based on the speed at which the subject matter is moving toward image capturing device 10. In one embodiment, redshift simulation program 80 applies a dark blue mask to objects that are moving at a speed that is above a pre-defined speed threshold. Redshift simulation program 80 applies a light blue mask to objects that are moving at a speed that is below a pre-defined speed threshold. In another example, redshift simulation program 80 applies blueshift to objects of an image based on their relative speeds. In such an example, redshift simulation program 80 applies a mask of the darker shade of blue to the object that is moving toward image capturing device 10 at the fastest speed, when compared to the shade of blue applied to the other objects in the image.

In another embodiment, redshift simulation program 80 applies a mask of a different color to focus points of the first image that have smaller distance values than their related focus points. In yet another embodiment, redshift simulation program 80 applies a mask of a specific pattern to focus points of the first image that have smaller distance values than their related focus points.

Figure 5:
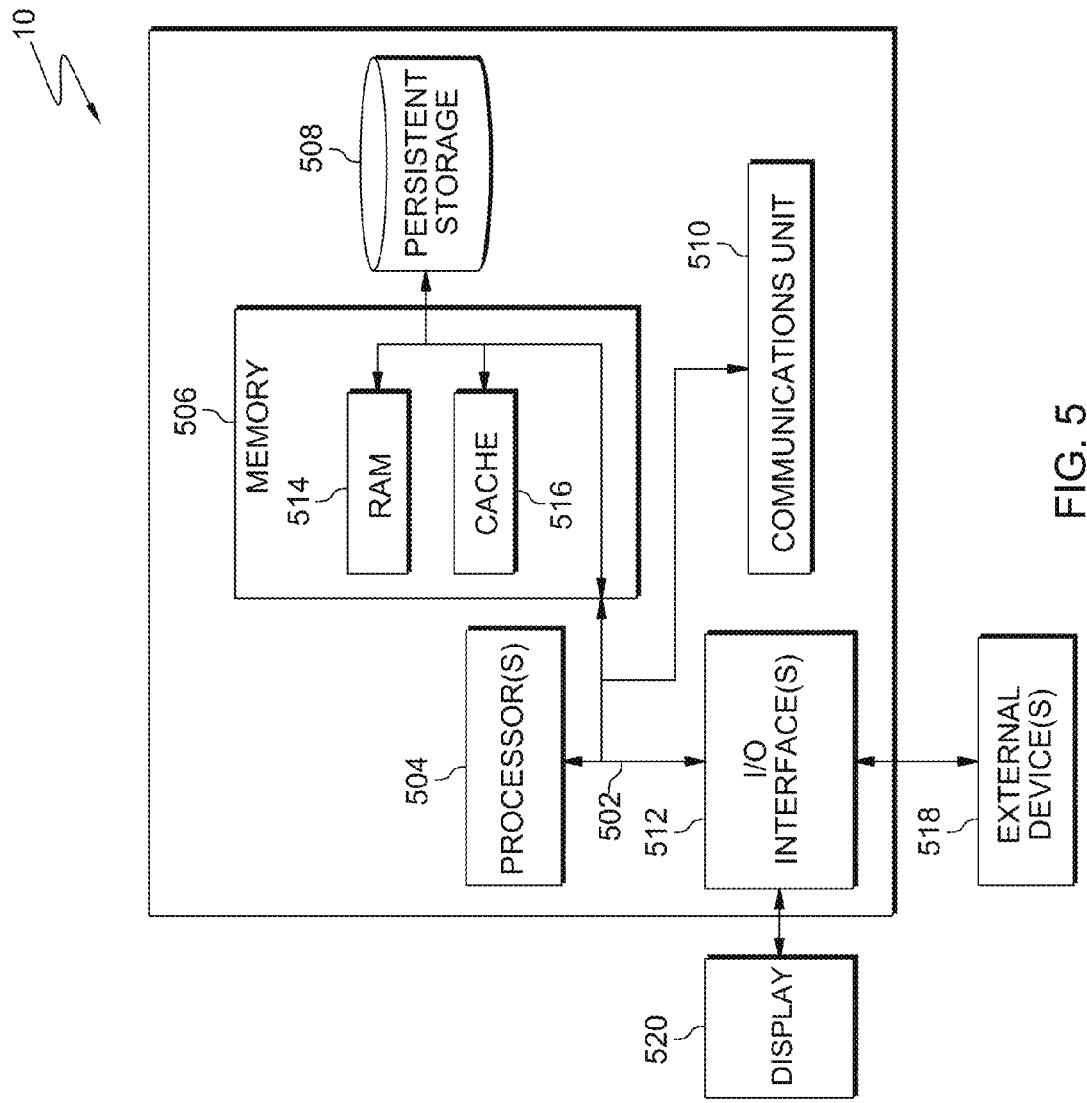
FIG. 5 depicts a block diagram of components of the image capturing device of FIG. 1, in accordance with one embodiment of the present invention.

FIG. 5 depicts a block diagram of components of image capturing device 10 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Image capturing device 10 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

UI 40, image capture program 60, object identification and distance program 70, and redshift simulation program 80 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other servers. In these examples, communications unit 510 includes one or more network interface cards. Communications unit 510 may provide communications through the use of either or both physical and wireless communications links. UI 40, image capture program 60, object identification and distance program 70, and redshift simulation program 80 may be downloaded to persistent storage 408 through communications unit 510.

I/O interface(s) 512 allows for input and output of data with other devices that may be connected to image capturing device 10. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., UI 40, image capture program 60, object identification and distance program 70, and redshift simulation program 80 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for visualizing motion of an object in an image, the method comprising the steps of:
    receiving at least two images, including a first image and a second image, wherein each of the at least two images includes an object;
    determining, by one or more processors, a first distance value for the object in the first image and a second distance value for the object in the second image, wherein each distance value is based on a distance between the object and an image capturing device;
    comparing, by one or more processors, the first distance value to the second distance value to determine a difference between the first distance value and the second distance value; and
    overlaying, by one or more processors, a mask on the first image based on the determined difference between the first distance value and the second distance value, wherein the mask is over the object of the first image.

2. The method of claim 1, further comprising:
    determining, by one or more processors, an order in which each of the at least two images were captured; and
    wherein the step of overlaying, by one or more processors, the mask on the first image is further based on the order in which each of the at least two images were captured.

3. The method of claim 1, wherein the step of comparing, by one or more processors, the first distance value to the second distance value to determine a difference between the first distance value and the second distance value comprises:
    comparing, by one or more processors, distance values of related focus points, wherein related focus points are focus points in separate images of the at least two images that share Cartesian coordinates.

4. The method of claim 2, wherein the step of determining, by one or more processors, an order in which each of the at least two images were captured comprises:
    receiving a time stamp associated with each of the at least two images; and
    determining, by one or more processors, the order in which each of the at least two images were captured based on the time stamps.

5. The method of claim 1, further comprising:
    determining, by one or more processors, a velocity of the object based on the difference between the first distance value and the second distance value and a time difference between capture of the first image and the second image.

6. The method of claim 5, wherein the mask is a first color if the velocity of the object is above a pre-defined threshold velocity and wherein the mask is a second color if the velocity of the object is below a pre-defined threshold velocity.

7. A computer program product for visualizing motion of an object in an image, the computer program product comprising:
    one or more computer readable storage media and program instructions stored on the one or more computer readable storage media, the program instructions comprising:
    program instructions to receive at least two images, including a first image and a second image, wherein each of the at least two images includes an object;
    program instructions to determine a first distance value for the object in the first image and a second distance value for the object in the second image, wherein each distance value is based on a distance between the object and an image capturing device;
    program instructions to compare the first distance value to the second distance value to determine a difference between the first distance value and the second distance value; and
    program instructions to overlay a mask on the first image based on the determined difference between the first distance value and the second distance value, wherein the mask is over the object of the first image.

8. The computer program product of claim 7, further comprising:
program instructions, stored on the one or more computer readable storage media, to determine an order in which each of the at least two images were captured; and
wherein program instructions to overlay the mask on the first image is further based on the order in which each of the at least two images were captured.

9. The computer program product of claim 7, wherein program instructions to compare the first distance value to the second distance value to determine a difference between the first distance value and the second distance value comprise:
program instructions to compare distance values of related focus points, wherein related focus points are focus points in separate images of the at least two images that share Cartesian coordinates.

10. The computer program product of claim 8, wherein program instructions to determine an order in which each of the at least two images were captured comprise:
program instructions to receive a time stamp associated with each of the at least two images; and
program instructions to determine the order in which each of the at least two images were captured based on the time stamps.

11. The computer program product of claim 7, further comprising:
program instructions to determine a velocity of the object based on the difference between the first distance value and the second distance value and a time difference between capture of the first image and the second image.

12. A computer system for visualizing motion of an object in an image, the computer system comprising:
one or more computer processors;
one or more computer readable storage media;
program instructions stored on the computer readable storage media for execution by at least one of the one or more processors, the program instructions comprising:
program instructions to receive at least two images, including a first image and a second image, wherein each of the at least two images includes an object;
program instructions to determine a first distance value for the object in the first image and a second distance value for the object in the second image, wherein each distance value is based on a distance between the object and an image capturing device;
program instructions to compare the first distance value to the second distance value to determine a difference between the first distance value and the second distance value; and
program instructions to overlay a mask on the first image based on the determined difference between the first distance value and the second distance value, wherein the mask is over the object of the first image.

13. The computer system of claim 12, further comprising:
program instructions, stored on the computer readable storage media for execution by at least one of the one or more processors, to determine an order in which each of the at least two images were captured; and
wherein program instructions to overlay the mask on the first image is further based on the order in which each of the at least two images were captured.

14. The computer system of claim 12, wherein program instructions to compare the first distance value to the second distance value to determine a difference between the first distance value and the second distance value comprise:
program instructions to compare distance values of related focus points, wherein related focus points are focus points in separate images of the at least two images that share Cartesian coordinates.

15. The computer system of claim 14, wherein program instructions to determine an order in which each of the at least two images were captured comprise:
program instructions to receive a time stamp associated with each of the at least two images; and
program instructions to determine the order in which each of the at least two images were captured based on the time stamps.

16. The computer system of claim 12, further comprising:
program instructions to determine a velocity of the object based on the difference between the first distance value and the second distance value and a time difference between capture of the first image and the second image.

17. The method of claim 5, wherein the object is a first object and the at least two images additionally include a second object and a third object, further comprising:
determining, by one or more processors, the velocity of the first object is greater than respective velocities of the second object and the third object; and
wherein the step of overlaying the mask on the first image comprises:
overlaying a first mask of a first color on the first image and over the first object, based on the velocity of the first object exceeding respective velocities of the second object and the third object; and
overlaying a second mask of a second color on the first image and over the second object and the third object.

18. The method of claim 1, wherein the mask is opaque.

19. The method of claim 1, wherein the overlaid mask on the first image reflects an exaggerated light shift property selected from the group consisting of: redshift and blueshift.

20. The method of claim 1, wherein the object is a first object and the at least two images additionally include a second object, further comprising:
determining, by one or more processors, that the determined difference between the first distance value and the second distance value is positive;
determining, by one or more processors, that a second distance a third distance value for the second object in the first image and a fourth distance value for the second object in the second image;
determining that a difference between the third distance value and the fourth distance value is negative; and
wherein the step of overlaying the mask on the first image comprises:
overlaying a first mask of a first color on the first image and over the first object, based on the positive determined difference between the first distance value and the second distance value; and
overlaying a second mask of a second color on the first image and over the second object, based on the negative determined difference between the third distance value and the fourth distance value.

* * * * *